Figure 1:
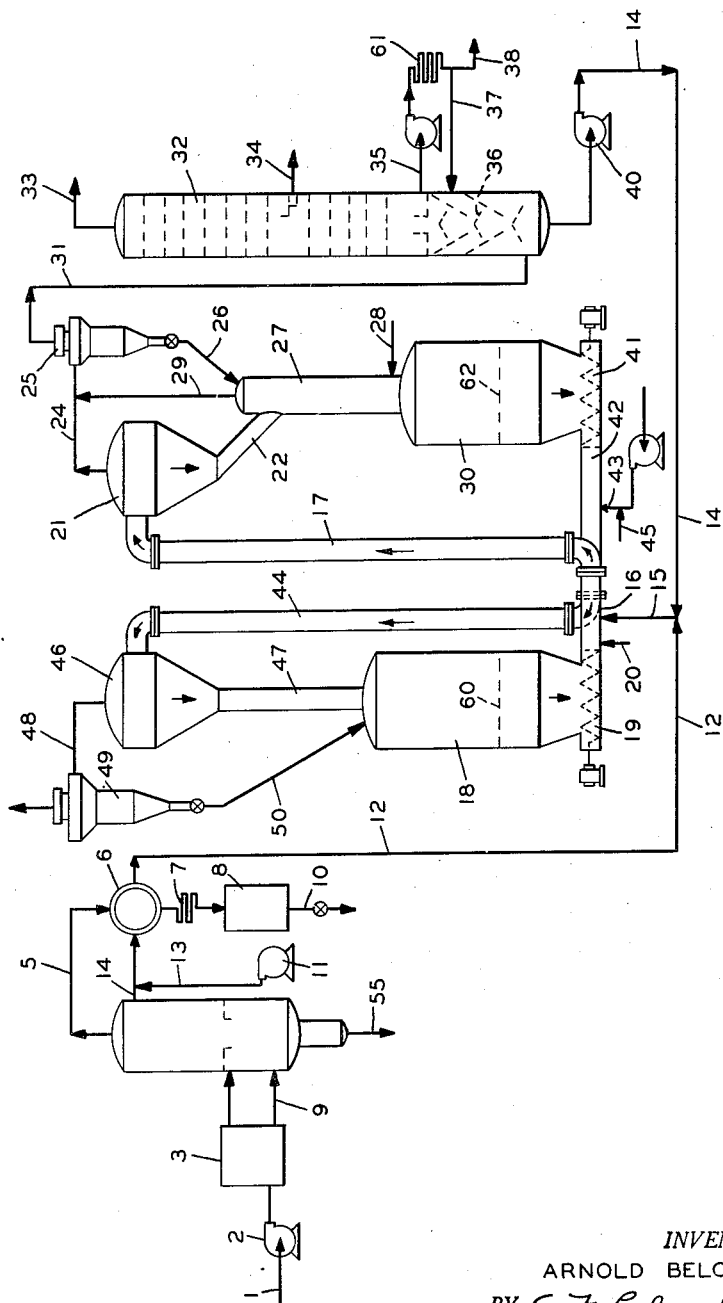

Aug. 28, 1956 A. BELCHETZ 2,760,916
CATALYTIC CONVERSION OF HYDROCARBONS
Original Filed Sept. 4, 1947 2 Sheets-Sheet 1

FIG. I

INVENTOR.
ARNOLD BELCHETZ
BY E. F. Liebrecht
D. H. Palmer
Edmond F. Shanahan
ATTORNEYS Aug. 28, 1956 A. BELCHETZ 2,760,916
CATALYTIC CONVERSION OF HYDROCARBONS
Original Filed Sept. 4, 1947 2 Sheets-Sheet 2

*INVENTOR.*
ARNOLD BELCHETZ
BY
ATTORNEYS

United States Patent Office 2,760,916
Patented Aug. 28, 1956

2,760,916

CATALYTIC CONVERSION OF HYDROCARBONS

Arnold Belchetz, Larchmont, N. Y., assignor to M. W. Kellogg Company, Jersey City, N. J., a corporation of Delaware Original application September 4, 1947, Serial No. 772,170. Divided and this application May 24, 1951, Serial No. 228,069

2 Claims. (Cl. 196—52)

This case is a division of my co-pending application Serial No. 772,170, filed September 4, 1947, now abandoned. The subject matter to which the claims of the present application are directed was disclosed in part in my original parent application, Serial No. 274,670, filed May 20, 1939 now U. S. Patent 2,253,486. Other features of the claimed subject matter first appeared in a subsequent parent application Serial No. 559,019, filed October 17, 1944, now abandoned. This case derives its priority from the following series of applications each co-pending with its predecessor:

Serial No. 274,670, filed May 20, 1939.
Serial No. 343,222, filed January 29, 1940, now abandoned.
Serial No. 559,019, filed October 17, 1944.
Serial No. 772,170, filed September 4, 1947.

In said original application, U. S. Patent No. 2,253,486 a process is disclosed for the conversion of hydrocarbons involving a continuous cyclic operation, wherein a finely divided catalytic material is mixed with a stream of the vapors of the hydrocarbons undergoing treatment, and the mixture passed continuously through a conversion zone maintained under suitable conditions to effect the desired conversion. The spent catalytic material is separated from the vaporous conversion products and regenerated for reuse in the conversion operation by combustion of the deactivating substances such as carbonaceous material deposited thereon during the conversion operation. Regeneration is then effected by mixing the spent catalytic material with an oxygen-containing gas and passing the mixture through a regeneration zone maintained under suitable conditions to effect the desired combustion without subjecting the catalyst to excessive temperatures which would unduly impair its catalytic activity.

A feature disclosed in said application Serial No. 274,670 and to which the present application is particularly directed resides in the procedure whereby the used catalyst is separated and recovered from the effluent conversion products from the catalytic conversion zone and returned to the regeneration zone.

In accordance with the present invention, the vaporous conversion products containing used catalyst are passed from the conversion zone to a gas-solid separating zone, or, preferably, a series of such zones, wherein all but a relatively small quantity of the catalyst is separated from the vapors, the vapors being maintained during the separation above the temperature at which substantial condensation can occur. In the initial separating zone, a large proportion of the used catalyst is preferably separated without any increase in the vapor velocity such as is involved in separation by means of cyclone type gas-solid separators. The used catalyst is thereafter caused to flow downwardly as a layer or column in countercurrent flow with an upwardly flowing stream of inert gas prior to its transfer to the regeneration zone whereby various important process advantages result, as pointed out hereinafter. The vaporous conversion products containing the small residual quantity of catalyst are then passed to a cooling zone wherein a small fraction of the highest high boiling constituents is condensed and in which heavy fraction the residual catalyst is concentrated by absorption or entrainment. The cooling and condensation step is preferably effected by passing the mixture of vapors and residual catalyst through the bottom part of a fractionating zone provided with baffles over which a cooled recycled stream of the high boiling condensate is circulated and through which the vaporous mixture is passed to effect the desired separation of the catalyst by absorption or entrainment in the condensed heavy fraction.

In the appended drawings, Figure 1 is a diagrammatic illustration of a suitable form of apparatus for the practice of a preferred embodiment of the invention wherein preheated catalyst is utilized to vaporize the feed stock.

Figure 2:
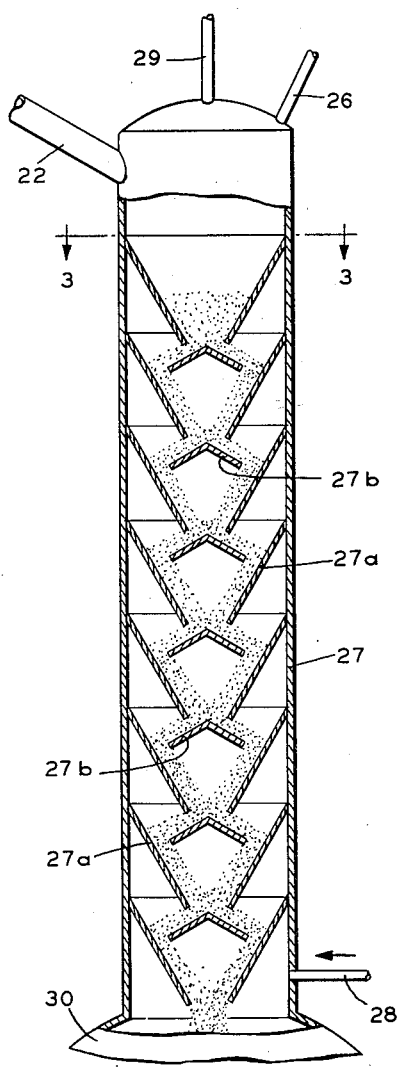
Figure 3:
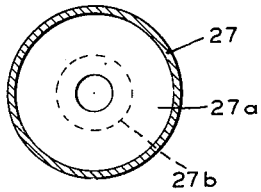

Figures 2 and 3 are enlarged and detailed views of tower 27.

Referring to the drawing, feed to the system, for example a reduced petroleum crude, enters from any convenient source indicated by the numeral 1 and pumped by pump 2 to a heater or furnace 3 wherein it is preheated to a suitable temperature then flash evaporated in evaporator 4.

The volatile portion of the crude is taken overhead from evaporator 4 as a gas oil fraction through line 5, and a heavy reisdual fraction is withdrawn at the bottom through line 55. From line 5 the gas oil vapors pass through a heat exchanger 6, then through a condenser coil 7 into accumulator 8. Steam introduced through line 9, is condensed together with the gas oil and separated therefrom in accumulator 8 through line 10. The gas oil condensate is pumped by pump 11 through line 13 to heat exchanger 6 and into line 12. Part of the gas oil is returned as reflux to the evaporator through line 14'.

The apparatus described above is merely illustrative and exemplary of conventional apparatus for supplying the gas oil or other treated hydrocarbon at a suitable temperature for the following conversion operation.

The preheated fresh feed in transfer line 12 may be advantageously combined with a hot recycle oil containing catalyst introduced through line 14 and produced in a later stage of the process pursuant to this invention as hereinafter described. The combined feed passes through line 15 into pipe 16 constituting an extension of the conversion reactor 17. Hot preheated catalyst is supplied from a collecting or surge drum 18 by suitable means such as a helical feeder 19 and mixed with the oil in pipe 16, the upper surface of the body of catalyst in drum 18 being indicated by dotted line 60. The quantity and temperature of the catalyst thus introduced preferably are sufficient to cause vaporization of the liquid oil feed thereby forming a suspension of the catalyst in the vapors. If desired, the feed may be vaporized prior to the admixture of regenerated catalyst therewith. Sufficient steam or other suitable gas to initially disperse the catalyst as discharged from feeder 19 is preferably introduced through line 20. Steam or other suitable gas may be supplied in greater quantities through line 20 when required to facilitate the vaporization of the combined oil charge and to supplement the vapors resulting from the vaporization of the feed stock and recycle oil to produce the required volume of gas to carry the catalyst through the conversion reactor 17. The dimension of reactor 17 may be varied and is such as to assure the desired conversion dependent upon variable conditions used such as the feed stock, catalyst and quantities thereof employed. Operating conditions in the conversion zone such as the ratio by weight of the catalyst to fresh feed stock may be and preferably are maintained as set forth in said co-pending application, Serial No. 274,670, that is greater than 2.5 to 1, and preferably greater than 5 to 1. The gaseous mixture of feed stock, catalyst and steam, flows upwardly through reactor 17 during which flow conversion or cracking of the oil to the desired extent occurs.

Reaction products pass from the top of reactor 17 to a separation system provided pursuant to the present invention which is especially effective for the recovery of catalyst from the vaporous reaction products.

As shown, this comprises a settling tank 21 of greater cross-sectional area in the direction of flow than the conversion zone in which the major proportion of the suspended catalyst is thus separated by simple settling, the separated catalyst flowing by gravity from the bottom of tank 21 through conduit 22 to the top of a steam stripping tower (27) and the vapors containing a relatively small fraction of fine catalytic material are withdrawn at the top through line 24. These vapors pass through line 24 to a suitable separator such as cyclone type of dust collector 25 wherein most of the remaining suspended catalyst is separated by centrifugal force due to the relative high velocity of the vapors in passing therethrough, and then pass to tower (27) by gravity flow from the bottom of the separator through line 26.

Stripping tower 27 serves to displace hydrocarbon vapors contained in the voids between the particles of catalyst and is suitably provided with baffles 27a and 27b to effectively expose the catalyst layer passing downwardly therethrough to the stripping or displacing action of a countercurrently flowing current of steam introduced at the base of the tower through line 28. Steam containing the oil vapors displaced from the catalyst is withdrawn from the top of the tower through line 29 and combined with the vapor stream from tank 21. Used catalyst falls from the bottom of tower 27 into a surge drum 30. Figure 2 is an enlarged view of tower 27 and illustrates the flow of catalyst downwardly therethrough, and Figure 3 is a sectional view taken along line 3—3.

The gas-solid separation zones constituted by settler 21 and cyclone 25 are maintained at a temperature above the condensation temperature of the vapors and serve to separate all but a small fraction of the total suspended solids, this unseparated fraction being normally less than 1% of the total and preferably of the order of 0.3% or less. The loss of this small percentage, however, would constitute a serious economical obstacle due to the exceedingly high quantities of catalyst circulated in catalytic systems of this type. In addition the consequent contamination of the liquid products by its presence therein would be highly undesirable.

The pressure of the gas components at the inlets to the conversion and regeneration zones obviously will necessarily be in excess of atmospheric pressure in both cases since a pressure drop is inevitable in the passage of the gas component through the system. Catalyst particles must be introduced to these inlets from drums 18 and 30 against the back pressure thus exerted in these inlets. Either feeder 19 or 41, or both may be "solids-pump" of the Fuller-Kinyon type as previously proposed in Degnen Patent No. 2,205,569. Since cyclone 25 discharges to tower 32 the pressure maintained therein must be sufficiently in excess of atmospheric pressure to overcome the pressure drop in tower 32, and correspondingly higher than the pressure in cyclone 49 from which discharge of flue gas is to the atmosphere. As illustrated in detail in Figure 2, a vertically extending and downwardly flowing columnar mass of catalyst particles is maintained in tower 27 by the addition of used catalyst particles from settler 21 and cyclone 25, and inert gas is introduced through line 28 at a pressure sufficient to cause the gas to flow upwardly in intimate contact with the down-flowing mass. Thus the catalyst particles are discharged from the base of the columnar mass into a gaseous atmosphere having a pressure substantially higher than the pressure prevailing at the top of the said mass, this increase corresponding to the pressure drop across the baffled portion of tower 27. This increase in pressure plus the difference in pressure between separator 25 and separator 49 is thus made available for the purpose of transferring the catalyst from drum 30 to the inlet 42 to the regeneration zone. Accordingly, the amount of pressure which need be "put up" by feeder 41 is thereby substantially reduced or may be entirely eliminated.

Preferably, the vaporous conversion products containing the small amount of residual catalyst are passed through line 31 to a cooling or partial condensation zone, suitably constituted by the lower section of a fractionating tower 32. Fractionating tower 32 may be a bubble tower of conventional design adapted to separate the vaporous conversion products into liquid fractions of desired boiling ranges, for example a low boiling fraction consisting of hydrocarbons within the gasoline boiling range may be withdrawn overhead through line 33, a light gas oil fraction through the side draw-off line 34, and a heavy gas oil fraction through side draw-off line 35. Condensate from vapors withdrawn through line 33 may be returned to the top tower as reflux in the conventional manner.

The lower section of tower 32 is preferably provided with baffles 36 or other suitable means for promoting gas-liquid contact. A portion of the heavy gas oil cut withdrawn through line 35 is cooled and returned to the cooling section in the lower part of tower 32 through line 37 and passes downwardly over the baffles 36 in countercurrent flow to the vapors introduced through line 31. The incoming vapors are thereby cooled sufficiently to condense a small fraction of the highest boiling constituents, for example about 10% and preferably of the order of about 5% or less of the total incoming vapors. The residual catalyst is entrained and concentrated in the high boiling fraction thus produced and withdrawn through line 39. This fraction is then preferably subjected to further treatment in a catalytic converson zone with additional quantities of feed. It may for example be suitably recycled to the same conversion zone in which it was intially produced by pump 40 and line 14 as previously described.

In the regeneration flow, used catalyst is fed from drum 30 (in which the upper surface of the catalyst mass is indicated by dotted line 62) by suitable means such as screw feeder 41 to pipe 42 and is carried therein by a current of oxygen-containing gas such as air injected through line 43 to regeneration or combustion chamber 44 in which combustion of the carbonaceous deposit on the spent catalyst occurs during the passage of the catalyst therethrough. Steam may be introduced to line 42 if desired through line 45.

Combustion gases bearing the regenerated catalyst pass from chamber 44 into a suitable recovering system for separating the catalyst. As shown, this system comprises a settling tank 46 wherein most of the catalyst is separated and flows downwardly therefrom through conduit 47 to surge drum 18. The separated gases contaning a small residual amount of catalyst fines leave separator 46 at the top through line 48 and pass to a cyclone type of dust collector 49, wherein substantially complete separation of the catalyst is effected. The separated catalyst from collector 49 then flows downwardly through line 50 and is combined with the initially separated catalyst in drum 18 from which it is fed directly to the conversion stage by feeder 19, as previously described. Drum 18 and feeder 19 may be suitably provided with heat insulation material to obviate loss of heat by the regenerated catalyst in its passage therethrough.

It is to be understood that the embodiment of the invention described in the foregoing is illustrative only, and that the essential features of the invention are capable of use in a wide variety of modified process flows. All such modifications are intended to be included within the scope of the appended claims.

We claim:

1. A continuous process for the catalytic conversion of hydrocarbons wherein said hydrocarbons are contacted in gaseous form with powdered solid catalyst, and wherein said powdered catalyst is continuously circulated within an enclosed system through a reaction zone and a regeneration zone, which process includes the steps of: continuously introducing said hydrocarbons into the lower portion of said reaction zone and passing same upwardly to form a suspension of said powdered catalyst in upflowing reactant gases; separating catalyst from reactant gases, and continuously withdrawing a stream of reactant gases from which catalyst has been separated from said enclosed system; introducing said separated catalyst into the upper region of a substantially vertical extended passageway; passing catalyst downwardly through said passageway in a free-flowing state, said extended passageway being such that a substantial pressure drop is developed by the frictional resistance to the flow of gas upwardly through said extended passageway; discharging catalyst under pressure from the lower region of said passageway directly into an enlarged enclosed accumulating zone; accumulating a mass of catalyst within said enlarged enclosed accumulating zone under a gaseous atmosphere having a pressure substantially higher than the pressure prevailing at the top of said columnar mass, whereby at least a part of the pressure head for transfer to said regeneration zone is provided by the gaseous pressure on the mass of catalyst in said accumulating zone, continuously withdrawing catalyst from said mass of catalyst in said enlarged enclosed accumulating zone; feeding said withdrawn catalyst into a regenerating gas in said regeneration zone; regenerating said catalyst in said regeneration zone and reintroducing said regenerated catalyst into said reaction zone.

2. A continuous process for the catalytic cracking of high boiling hydrocarbons wherein said hydrocarbons are contacted in gaseous form with powdered solid cracking catalyst, and wherein said powdered cracking catalyst is continuously circulated within an enclosed system through a cracking zone and a regeneration zone, which process includes the steps of: continuously introducing said hydrocarbons into the lower portion of said cracking zone and passing same upwardly to form a suspension of said powdered cracking catalyst in upflowing reactant gases; separating used cracking catalyst from reactant gases, and continuously withdrawing a stream of reactant gases from which used catalyst has been separated from said enclosed system; introducing said separated catalyst into the upper region of a substantially vertical extended passageway, passing aerated used catalyst downwardly through said passageway in a free-flowing state, said extended passageway being such that a substantial pressure drop is developed by the frictional resistance to the flow of gases upwardly through said extended passageway; discharging catalyst under pressure from the lower region of said passageway directly into an enlarged enclosed accumulating zone; accumulating a mass of catalyst within said enlarged enclosed accumulating zone under a gaseous atmosphere having a pressure substantially higher than the pressure prevailing at the top of said columnar mass of aerated used catalyst, whereby at least a part of the pressure head for transfer to said regeneration zone is provided by the gaseous pressure on the mass of catalyst in said accumulation zone, continuously withdrawing used catalyst from said mass of catalyst in said enlarged enclosed accumulating zone; feeding said withdrawn catalyst into a regenerating gas in said regeneration zone; regenerating said catalyst in said regeneration zone and reintroducing said regenerated catalyst into said cracking zone.

References Cited in the file of this patent

UNITED STATES PATENTS

| 1,836,301 | Bechthold | Dec. 15, 1931 |
| 1,863,803 | Pantenburg | Jan. 21, 1932 |
| 2,079,158 | De Rachot | May 4, 1937 |
| 2,231,424 | Huppke | Feb. 11, 1941 |
| 2,273,075 | Weems | Feb. 17, 1942 |
| 2,302,209 | Goddin | Nov. 17, 1942 |
| 2,353,495 | Payne | July 11, 1944 |
| 2,488,032 | Johnson | Nov. 15, 1949 |